United States Patent
Watanabe et al.

(10) Patent No.: US 11,133,011 B2
(45) Date of Patent: Sep. 28, 2021

(54) SYSTEM AND METHOD FOR MULTICHANNEL END-TO-END SPEECH RECOGNITION

(71) Applicant: Mitsubishi Electric Research Laboratories, Inc., Cambridge, MA (US)

(72) Inventors: Shinji Watanabe, Arlington, MA (US); Tsubasa Ochiai, Kyoto-fu (JP); Takaaki Hori, Lexington, MA (US); John R Hershey, Winchester, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/723,672

(22) Filed: Oct. 3, 2017

(65) Prior Publication Data
US 2018/0261225 A1    Sep. 13, 2018

Related U.S. Application Data

(60) Provisional application No. 62/470,511, filed on Mar. 13, 2017.

(51) Int. Cl.
*G10L 15/28*    (2013.01)
*G10L 21/0216*    (2013.01)
(Continued)

(52) U.S. Cl.
CPC .............. *G10L 15/28* (2013.01); *G10L 15/16* (2013.01); *G10L 15/20* (2013.01);
(Continued)

(58) Field of Classification Search
CPC .......... G10L 15/28; G10L 15/16; G10L 15/20
(Continued)

(56) References Cited

U.S. PATENT DOCUMENTS 5,305,008 A * 4/1994 Turner .................. G01S 13/758
    342/44
6,304,618 B1 * 10/2001 Hafeez ................ H04L 25/0204
    375/262

(Continued)

OTHER PUBLICATIONS

Heymann et al., "Beamnet: End to End Training of a beamformer supported Multi channel ASY system," 2017 IEEE International Conference on Acoustics, Speech and Signal Processing (ICASSP), IEEE. Mar. 5, 2017. pp. 5325-5329.

(Continued)

*Primary Examiner* — Jakieda R Jackson
(74) *Attorney, Agent, or Firm* — Gennadiy Vinokur; Hironori Tsukamoto

(57) ABSTRACT

A speech recognition system includes a plurality of microphones to receive acoustic signals including speech signals, an input interface to generate multichannel inputs from the acoustic signals, one or more storages to store a multichannel speech recognition network, wherein the multichannel speech recognition network comprises mask estimation networks to generate time-frequency masks from the multichannel inputs, a beamformer network trained to select a reference channel input from the multichannel inputs using the time-frequency masks and generate an enhanced speech dataset based on the reference channel input and an encoder-decoder network trained to transform the enhanced speech dataset into a text. The system further includes one or more processors, using the multichannel speech recognition network in association with the one or more storages, to generate the text from the multichannel inputs, and an output interface to render the text.

21 Claims, 9 Drawing Sheets

(51) Int. Cl.
*G10L 15/16* (2006.01)
*G10L 15/20* (2006.01)
*G10L 25/30* (2013.01)

(52) U.S. Cl.
CPC .......... *G10L 21/0216* (2013.01); *G10L 25/30* (2013.01); *G10L 2021/02166* (2013.01)

(58) Field of Classification Search
USPC .................. 704/226, 202, 205, 232, 235
See application file for complete search history.

(56) References Cited

U.S. PATENT DOCUMENTS

| | | | |
|---|---|---|---|
| 6,937,980 B2 | 8/2005 | Krasny et al. | |
| 9,094,645 B2* | 7/2015 | Kim | H04N 5/602 |
| 9,215,527 B1* | 12/2015 | Saric | H04R 3/005 |
| 9,286,897 B2 | 3/2016 | Bisani et al. | |
| 9,972,339 B1* | 5/2018 | Sundaram | G10L 25/78 |
| 10,224,058 B2* | 3/2019 | Variani | G10L 25/30 |
| 2007/0100605 A1* | 5/2007 | Renevey | G10L 21/0272 704/201 |
| 2011/0307244 A1* | 12/2011 | He | G06F 40/45 704/4 |
| 2012/0330653 A1* | 12/2012 | Lissek | H04M 1/035 704/226 |
| 2014/0337021 A1* | 11/2014 | Kim | G10L 21/0208 704/228 |
| 2015/0095026 A1* | 4/2015 | Bisani | H04R 3/005 704/232 |
| 2015/0110284 A1* | 4/2015 | Niemisto | G10L 21/0208 381/71.1 |
| 2016/0086602 A1* | 3/2016 | Hwang | G10L 21/0208 704/233 |
| 2016/0322055 A1* | 11/2016 | Sainath | H04R 3/005 |
| 2017/0178662 A1* | 6/2017 | Ayrapetian | G10L 21/0216 |
| 2017/0162194 A1 | 8/2017 | Nesta et al. | |
| 2017/0236531 A1* | 8/2017 | Koretzky | G06F 3/04847 381/17 |
| 2017/0278513 A1* | 9/2017 | Li | G10L 15/20 |
| 2018/0174575 A1* | 6/2018 | Bengio | G10L 15/16 |
| 2019/0139552 A1* | 5/2019 | Kim | G10L 17/005 |
| 2019/0259409 A1* | 8/2019 | Variani | G10L 15/16 |

OTHER PUBLICATIONS

Kim et al., "Recurrent Models for Auditory Attention in Multi-Microphone Distance Speech Recognition," Nov. 19, 2015, https://arxiv.org/pdf/1511.06407.pdf. retrieved May 25, 2018.
Heymann et al., "BLSTM Supported GEV Beamformer Front end for the 3rd Chime Challenge," 2015 IEEE Workshop on Automatic Speech Recognition and Understanding (ASRU), IEEE, Dec. 13, 2015. pp. 444-451.
Takaaki et al., "Multi-Microphone Speech Recognition Integrating Beamforming, Robust feature Extraction and advanced DNN/RNN backend." Computer Speech and Language, Elsevier London, GB. vol. 46, Feb. 27, 2017. pp. 401-418.
Ochiai et al., "Multichannel End-to-End Speech Recognition," arxiv.org, Cornell University Library, 201 Olin Library Cornell University, Ithaca, NY, 14853. Mar. 14, 2017.
Zhang et al. Deep Neural Network-Based Bottleneck Feature and Denoising Autoencoder-Based Dereverberation for Distant-Talking Speaker Identification (Published: May 2015), EURASIP Journal on Audio, Speech, and Music Processing.
Inria et al. Robust ASR Using Neural Network Based Speech Enhancement and Feature Simulation, IEEE Automatic Speech Recognition and Understanding Workshop (Published: Sep. 2015).
Zhanga et al. Deep Learning for Environmentally Robust Speech Recognition: An Overview of Recent Developments, Huawei Technologies ( Published: May 2017).
Chorowski et al., "End-to-end Continuous Speech Recognition using Attention-based Recurrent NN: First Results." As accepted to: Deep Learning and Representation Learning Workshop, NIPS 2014, Cornell University Library, Neural and Evolutionary Computing (cs.NE); Learning (cs.LG); Machine Learning (stat.ML).

\* cited by examiner

| MODEL | DEV SIMU | DEV REAL | EVAL SIMU | EVAL REAL |
|---|---|---|---|---|
| NOISY | 25.0 | 24.5 | 34.7 | 35.8 |
| BEAMFORMIT | 21.5 | 19.3 | 31.2 | 28.2 |
| FILTER_NET | 19.1 | 20.3 | 28.2 | 32.7 |
| MASK_NET (REF) | 15.5 | 18.6 | 23.7 | 28.8 |
| MASK_NET (ATT) | 15.3 | 18.2 | 23.7 | 26.8 |

FIG. 5

| MODEL | DEV | EVAL |
|---|---|---|
| NOISY | 41.8 | 45.3 |
| BEAMFORMIT | 44.9 | 51.3 |
| MASK_NET (ATT) | 35.7 | 39.0 |

FIG. 6

| MODEL | CHANNEL | DEV |
|---|---|---|
| | ISOLATED_1CH_TRACK | |
| NOISY | | 87.9 |
| MASK_NET (AITT)<br>MASK_NET (AITT) | 5_6_4_3_1<br>3_4_1_5_6 | 91.2<br>91.2 |
| MASK_NET (AITT)<br>MASK_NET (AITT) | 5_6_4_1<br>5_6_4 | 91.1<br>90.9 |

FIG. 7

SYSTEM AND METHOD FOR MULTICHANNEL END-TO-END SPEECH RECOGNITION

TECHNICAL FIELD

This invention relates generally to speech processing and more particularly to multichannel speech recognition.

BACKGROUND

Existing automatic speech recognition (ASR) systems are based on a complicated hybrid of separate components, including acoustic, phonetic, and language models. Such systems are typically based on deep neural network acoustic models combined with hidden Markov models to represent the language and phonetic context-dependent state and their temporal alignment with the acoustic signal (DNN-HMM).

As an alternative, streamline speech recognition paradigm has attracted great research interest. This paradigm simplifies the above hybrid architecture by subsuming it into a neural network. For example, an attention-based encoder-decoder framework integrates all of those components using a set of recurrent neural networks (RNNs), which map from acoustic feature sequences to character label sequences. See, Chorowski for "End-to-end Continuous Speech Recognition using Attention-based Recurrent NN" (2014).

However, existing end-to-end frameworks merely focus on clean speech for achieving good performance in noisy environments, and cannot be applied to multichannel acoustic signals.

SUMMARY OF THE INVENTION

It is an object of some embodiments to provide a system and a method for automatic speech recognition (ASR) suitable for recognizing speech and converting the recognized speech into text from multichannel acoustic signals of multiple microphones. According to embodiments, a multichannel end-to-end speech recognition framework is trained to directly translate multichannel acoustic signals with speech signals to text. In this case, the multichannel end-to-end framework is to optimize the entire inference procedure, including the beamforming, based on the final ASR objectives, such as word/character error rate (WER/CER).

Unlike the traditional beamforming method that optimizes delay-and-sum and filter-and-sum based on a signal-level loss function independently for speech recognition task, the multichannel end-to-end framework according to some embodiments of the present invention incorporates the neural beamforming mechanisms as a differentiable component to allow joint optimization of the multichannel speech enhancement within the end-to-end system to improve the ASR objective. In other words, the multichannel end-to-end framework according to some embodiments includes a network first estimates time-frequency masks, which are used to compute expected speech and noise statistics regarding power spectral density (PSD) matrices relevant to speech and noise signals. In this case, the speech and noise statistics are time-invariant features. Using these statistics, the filter coefficients are computed based on the MVDR (minimum variance distortionless response) formalization, and then the estimated filter coefficients are then applied to the multichannel noisy speech signal to enhance the speech signal.

It is another object of some embodiments to provide the speech recognition system suitable for recognizing speech in noisy environments. It is another object of some embodiments to perform speech recognition with a neural network trained in an end-to-end fashion.

Some embodiments are based on recognition that multichannel speech enhancement techniques with beamforming can improve speech recognition in the presence of background noise. Further, it was recognized that the beamforming can be performed using a neural network that makes the beamforming differentiable. Thus, a beamforming neural network can be integrated with a neural network trained to recognize clean speech. In such a manner, a neural network designed to enhance the speech signal is combined with neural network designed to recognize the speech to form a multichannel end-to-end speech recognition system including a single neural network formed by a combination of sub-networks. The sub-networks may include a mask estimation network, a filter estimation network, beamformer networks, an encoder decoder network including an attention-based encoder decoder network.

In some embodiments, the beamformer network may include the mask estimation network and the filter estimation network. Further, the beamformer network can be trained to select a reference channel input from the multichannel inputs from the multiple microphones using time-frequency masks and generate an enhanced speech dataset based on the reference channel input.

Some embodiments are based on understanding that those networks can be trained separately, e.g., beamforming neural network can be trained to produce a clean speech from the noisy speech and the speech recognition neural network can be trained to recognize and convert the clean speech into text. However, such training requires ground truth data representing the clean speech. For example, it is recognized that beamforming techniques such as delay-and-sum and filter-and-sum can be optimized based on a signal-level loss function, independently of speech recognition task.

Some embodiments incorporate neural beamforming mechanisms as a differentiable component to allow joint optimization of the multichannel speech enhancement within the end-to-end system to improve the ASR objective. In such a manner, the multichannel end-to-end speech recognition system according to some embodiments is adaptable to noisy background including speech signals. For example, some embodiment jointly train both sub-network in the end-to-end fashion to recognize and convert noisy speech into text.

Such a joint training can improve the performance of the multichannel end-to-end speech recognition system, since the multichannel end-to-end framework allows optimizing the entire inference procedure, including the beamforming, based on the final ASR objectives, such as word/character error rate (WER/CER).

According to embodiments of the present invention, a multichannel end-to-end speech recognition system including the beamformer networks and mask estimation networks may reduce central processing unit (CPU) usage or graphic processing unit (GPU) usage, power consumption, and/or network bandwidth usage.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 5 shows experimental results indicating character error rate for CHiME-4 corpus, according to embodiments of the present invention;

FIG. 6 shows experimental results for the AMI corpus, indicating comparison of the recognition performance of the three systems, according to embodiments of the present invention;

FIG. 7 shows experimental results indicating an influence of the CHiME-4 validation accuracies, according to embodiments of the present invention;

Figure 1:
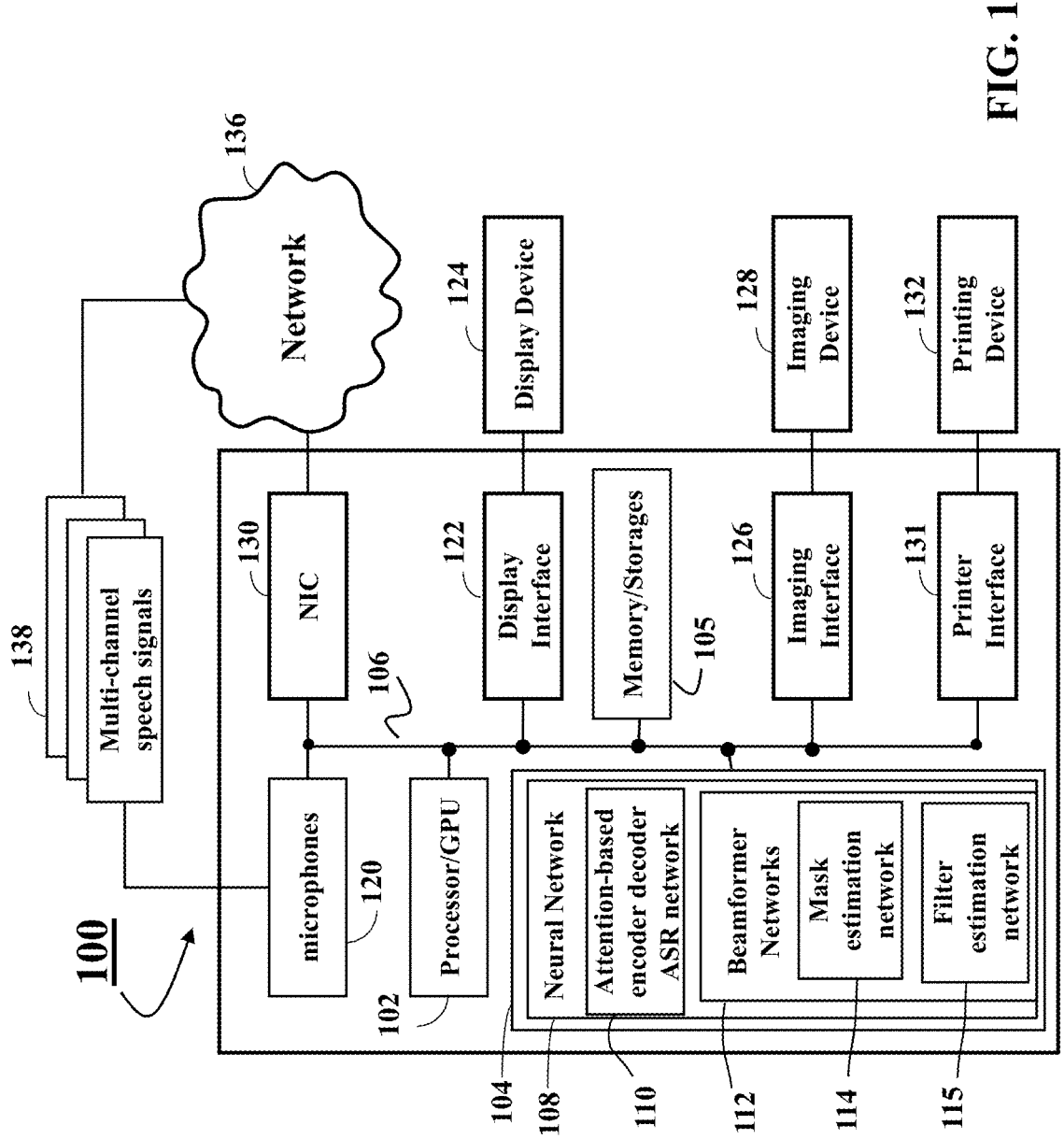
FIG. 1 shows a block diagram of a speech recognition system for speech recognition in accordance with some embodiments of the present invention.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION OF THE PREFERRED EMBODIMENTS

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

FIG. 1 shows a block diagram of a speech recognition system 100 for speech recognition in accordance with some embodiments. The system 100 includes a processor 102 configured to execute stored instructions, as well as a memory 104 that stores instructions regarding an automatic speech recognition (ASR) network, an encoder decoder network 110, a beamformer network 112, a mask estimation network 114, and a filter estimation network 115 that are executable by the processor. The processor 102 can be a single core processor, a multi-core processor, a graphic processing unit (GPU), a computing cluster, or any number of other configurations. The memory 104 can include random access memory (RAM), read only memory (ROM), flash memory, or any other suitable memory systems. The memory 104 can also include a hard drive, an optical drive, a thumbdrive, an array of drives, or any combinations thereof. The processor 102 is connected through a bus 106 to one or more input and output interfaces/devices.

The memory 104 stores a neural network 108 trained to transform multi-channel speech signals into a text and a processor 102 executing the stored instructions performs the speech recognition using the neural network 108 retrieved from the memory 104. The neural network 108 is trained to transform multi-channel noisy speech signals into a text. The neural network 108 may include an attention-based encoder decoder ASR network 110 as a first neural sub-network designed to enhance the speech signal and trained to select a single-channel signal from the multi-channel signals. The neural network 108 also includes beamformer networks 112, a mask estimation network 114 and a filter estimation network 115 as a second sub-network, in which both networks 114 and 115 can be designed to integrate with the encoder decoder network 110 for speech recognition and trained to recognize text from speech features of the multi-channel signals. Further, the beamformer network 112 may be used to determine a reference mike from the microphones 120 to determine a dominant speech signal from the multichannel speech signals for performing accurate speech recognition. The first sub-network and the second sub-network can be jointly trained to form a multichannel end-to-end speech recognition system 100.

In one embodiment, the neural network 108 also includes a feature extractor (not shown) configured to extract the speech features from the single-channel signal to be used by the second sub-network. The feature extractor is a differentiable function and thus can be connected into the single end-to-end neural network. Examples of the differentiable function include a Mel function of a magnitude of the channel signal and a bark function of a magnitude of the channel signal.

In one implementation, the differentiable function is a third neural sub-network trained to extract the speech features from the channel signal. In this implementation, the third sub-network is jointly trained with the first sub-network and the second sub-network.

A differentiable function can be optimized using a gradient descent method so that the output of the function approaches a target output for a given input. The function can also be approximated to an unknown mapping function using paired input and target output samples so that all the input samples are mapped to the corresponding target samples as correctly as possible.

Since composition of differentiable functions is also differentiable, we can combine cascaded processing modules, each of which is designed as a differentiable function, to optimize them jointly.

Neural networks are differentiable functions. In this invention, all the components of end-to-end multichannel speech recognition can be implemented with differentiable functions including multiple neural networks.

The system 100 includes an input interface to accept multi-channel speech signals and an output interface to render the recognized text. Examples of the input interface include multiple microphones 120 to convert sound into multi-channel speech signals 138. Additionally, or alternatively, the input interface can include a network interface controller (NIC) 130 adapted to connect the system 100 through the bus 106 to a network 136. Through the network 136, the multi-channel speech signal 138 can be downloaded and stored for further processing.

Examples of output interface include a display interface 122, an imaging interface 126, and a printer interface 130. For example, the system 100 can be linked through the bus 106 to a display interface 122 adapted to connect the system 100 to a display device 124, wherein the display device 124 can include a computer monitor, camera, television, projector, or mobile device, among others.

Additionally, or alternatively, the system 100 can be connected to an imaging interface 126 adapted to connect the system to an imaging device 128. The imaging device 128 can include a camera, computer, scanner, mobile device, a webcam, or any combination thereof. Additionally, or alternatively, the system 100 can be connected to a printer interface 131 adapted to connect the system 100 to a printing device 132. The printing device 132 can include a liquid inkjet printer, solid ink printer, large-scale commercial printer, thermal printer, UV printer, or dye-sublimation printer, among others.

Figure 2:
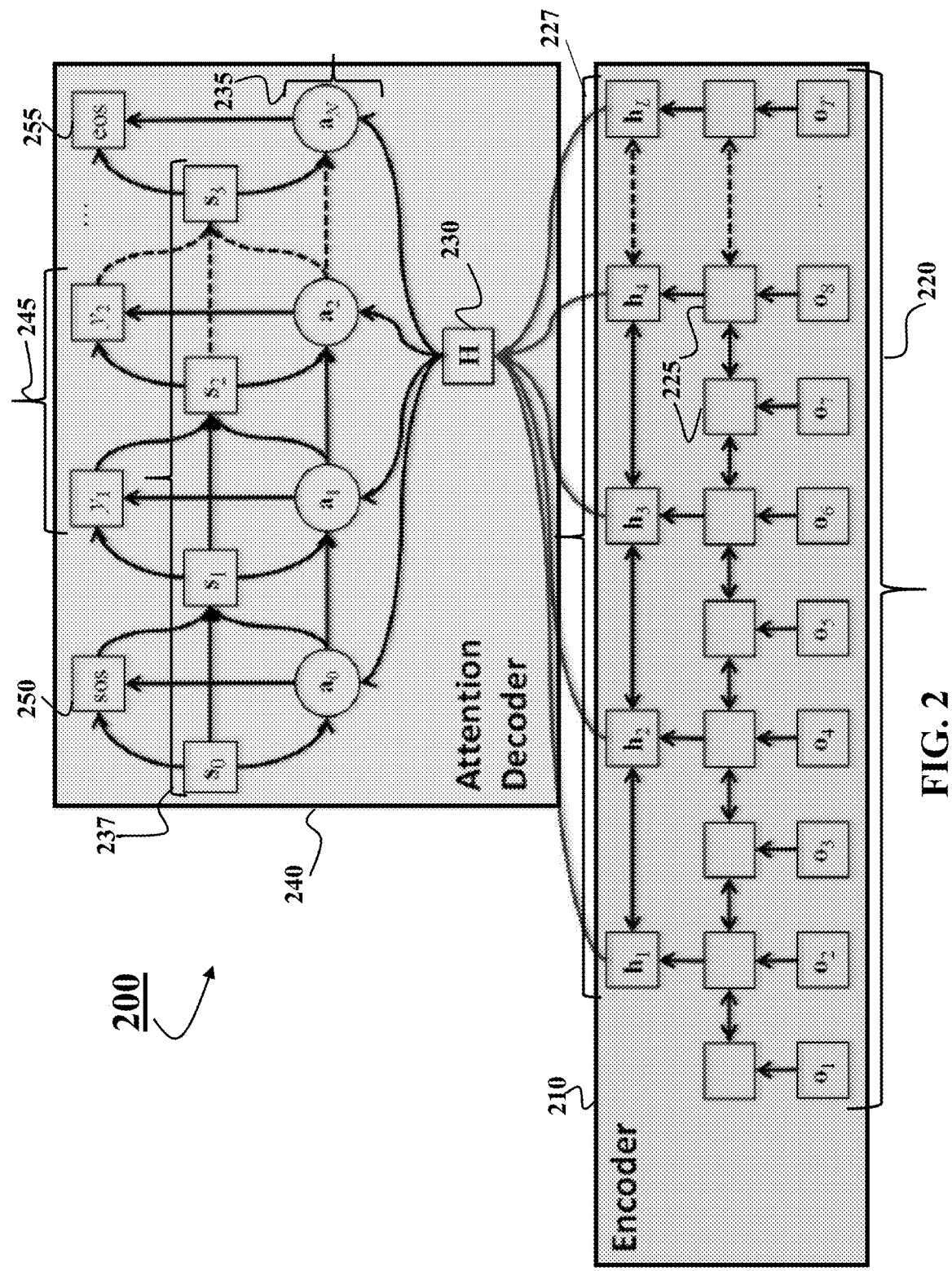
FIG. 2 is a block diagram illustrating an attention-based encoder-decoder network, according to some embodiments of the present invention.

FIG. 2 shows a schematic of an attention-based encoder-decoder network 200 designed to generate a character sequence (texts) according to embodiments. In these embodiments, the network 200 includes an encoder network (encoder) 210 and an attention-based decoder neural network (attention decoder) 240. The encoder network 210 transforms an input sequence O 220 into a high-level feature sequence H 230, and then the decoder network 240 generates a character sequence Y 245 through the attention mechanism.

Specifically, the attention-based encoder-decoder neural network 200 allows processing sequences of varying length. The encoder-decoder neural network includes two recurrent neural networks (RNNs), referred herein as encoder 210 and decoder 240 respectively, and an attention mechanism 230, which connects the encoder and the decoder.

Given a T-length sequence of speech features $O=\{o_t \in R^{D_O}|t=1, \ldots, T\}$, the network 200 generates an N-length sequence of output labels (a character sequence) $Y=\{y_n \in V|n=1, \ldots, N\}$. In some embodiments, the speech features $o_t$ is a $D_O$-dimensional feature vector (e.g., log Mel filterbank) at input time step t, and $y_n$ is a label symbol (e.g., character) at output time step n in label set V.

First, the encoder 210 transforms 225 an input sequence $O_t$ 220, to an L-length high-level feature sequence $H=\{h_l \in R^{D_H}|l=1, \ldots, L\}$, where $h_l$ is a DH-dimensional state vector 227 at a time step l of encoder's top layer. In this case, a subsampling technique is applied to reduce the length of the input sequence $o_t$ 220 according to a predetermined sampling ratio.

In some embodiments, the encoder is a bidirectional long short-term memory (BLSTM) recurrent network. To reduce the input sequence length, some implementations apply the subsampling technique to some layers. Therefore, l represents the frame index subsampled from t and L is less than T.

Next, the attention mechanism of the attention decoder network 240 integrates all encoder outputs H into a $D_H$-dimensional context vector $c_n \in R^{D_H}$ based on an L-dimensional attention weight vector $a_n \in [0,1]^L$ 235, which represents a soft alignment of encoder outputs at an output time step n. For example, one embodiments use a location-based attention mechanism with $a_n$ and $c_n$ are formalized as follows:

$$f_n = F * a_{n-1}, \quad (1)$$

$$k_{n,l} = w^T \tanh(V^S s_n + V^H h_l + V^F f_{n,l} + b), \quad (2)$$

$$a_{n,l} = \frac{\exp(\alpha k_{n,l})}{\sum_{l=1}^{L} \exp(\alpha k_{n,l})}, \quad c_n = \sum_{l=1}^{L} a_{n,l} h_l, \quad (3)$$

where $w \in R^{1 \times D_W}$, $V^H \in R^{D_W \times D_H}$, $V^S \in R^{D_W \times D_S}$, $V^F \in R^{D_W \times D_F}$ are trainable weight matrices, $b \in R^{D_W}$ is a trainable bias vector, $F \in R^{D_F \times 1 \times D_f}$ is a trainable convolution filter. $s_n \in R^{D_S}$ is a $D_S$-dimensional hidden state vector obtained from an upper decoder network at n, and $\alpha$ denotes the convolution operation.

Then, the attention decoder network 240 incrementally updates a hidden state $s_n$ and generates an output label $y_n$ 245 as follows:

$$s_n = \text{Update}(s_{n-1}, c_{n-1}, y_{n-1}), \quad (4)$$

$$y_n = \text{Generate}(s_n, c_n), \quad (5)$$

where the Generate(•) and Update(•) functions are composed of a feed forward network and an LSTM-based recurrent network, respectively.

Now, we can summarize these procedures as follows:

$$P(Y \mid O) = \prod_n P(y_n \mid O, y_{1:n-1}), \quad (6)$$

$$H = \text{Encoder}(O), \quad (7)$$

$$c_n = \text{Attention}(a_{n-1}, s_n, H), \quad (8)$$

$$y_n = \text{Decoder}(c_n, y_{1:n-1}), \quad (9)$$

where Encoder(•)=BLSTM(•), Attention(•) corresponds to Eqs. (1)-(3), and Decoder(•) corresponds to Eqs. (4) and (5). Here, special tokens for start-of-sentence (sos) 250 and end-of-sentence (eos) 255 are added to the label set V. The decoder starts the recurrent computation with the (sos) label 250 and continues to generate output labels 245 until the (eos) label 255 is emitted.

In one embodiment, based on the cross-entropy criterion, the loss function is defined using equation (6) as follows:

$$L = -\ln P(Y^* \mid O) = -\sum_n \ln P(y_n^* \mid O, y_{1:n-1}^*), \quad (10)$$

where Y* is the ground truth of a whole sequence of output labels and $y^*_{1:n-1}$ is the ground truth of its subsequence until an output time step n-1.

Accordingly, the whole networks including the encoder 210 and the attention decoder 240 can be optimized to generate the correct label sequence using the ground truth of the whole sequence.

Neural Beamformers (Beamformer Networks)

Neural beamformers are described in detail in the following. Also, the neural beamformers may be referred to as beamformer networks. The beamforming is a procedure to select a reference microphone signal from multiple microphones' signals.

The neural beamformers can be integrated with the encoder-decoder network. According to an embodiment of the present disclosure, frequency-domain beamformers may be used for achieving significant computational complexity reduction in multichannel neural processing, computational power reduction leading, rather than using the time-domain beamformers. Accordingly, each of the beamformer networks uses frequency-domain data sets. This may reduce central processing unit (CPU) usage or graphic processing unit (GPU) usage, power consumption, and/or network bandwidth usage.

For example, some implementations use frequency-domain beamformers rather than time-domain ones to achieve computational complexity reduction in multichannel neural processing.

In the frequency domain representation, a filter-and-sum beamformer obtains an enhanced signal by applying a linear filter as follows:

$$\hat{x}_{t,f} = \sum_{c=1}^{C} g_{t,f,c} x_{t,f,c}, \quad (11)$$

where $x_{t,f,c} \in \mathbb{C}$ is an STFT coefficient of c-th channel noisy signal at a time-frequency bin (t,f). $g_{t,f,c} \in \mathbb{C}$ is a corresponding beamforming filter coefficient. $\hat{x}_{t,f} \in \mathbb{C}$ is an enhanced STFT coefficient, and C is the numbers of channels.

Some embodiments implement different types of neural beamformers using the equation (11). The first type implements filter estimation neural network and the second type implements mask estimation neural network. One of the difference between the filter estimation neural network and the mask estimation neural network is how to compute the filter coefficient $g_{t,f,c}$.

Filter Estimation Network

Figures 3A, 3B:
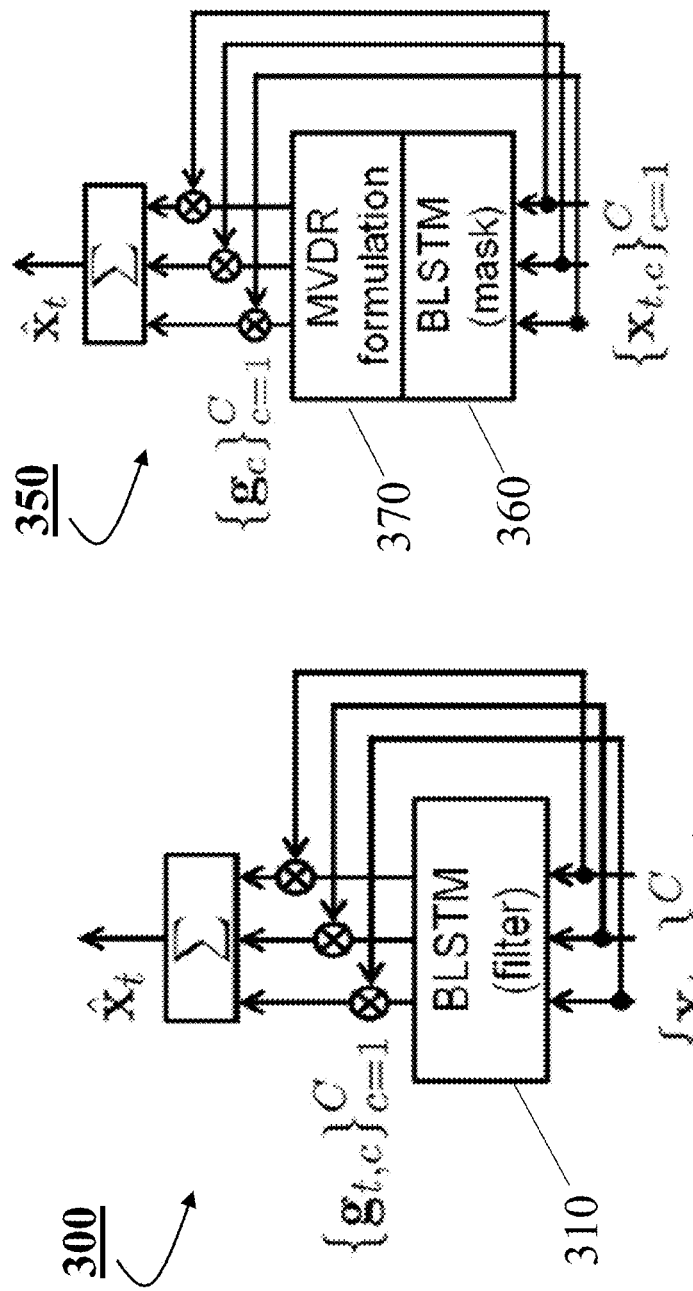
FIG. 3A is a block diagram illustrating a beamforming using a filter estimation network, according to some embodiments of the present invention.
FIG. 3B is a block diagram illustrating a beamforming using a mask estimation network and an MVDR formalization, according to some embodiments of the present invention.

FIG. 3A is a block diagram illustrating a beamforming using a filter estimation network 300, according to some embodiments of the present invention. In this case, the filter estimation network 300 directly estimates the filter coefficients according to some embodiments. For example, one embodiment directly estimates a time-variant filter coefficients $\{g_{t,f,c}\}_{t=1,f=1,c=1}^{T,F,C}$ as the outputs of the network. F is the dimension of STFT features.

The filter estimation network 300 uses a single real-valued BLSTM network 310 to predict the real and imaginary parts of the complex-valued filter coefficients at every time step. Therefore, one implementation introduces multiple (2×C) output layers to separately compute the real and imaginary parts of the filter coefficients for each channel. Then, the network outputs time-variant filter coefficients $g_{t,c} = \{g_{t,f,c}\}_{f=1}^{F} \in \mathbb{C}^F$ at a time step t for c-th channel as follows;

$$Z = \text{BLSTM}(\{\bar{x}_t\}_{t=1}^T), \quad (12)$$

$$\Re(g_{t,c}) = \tan h(\mathbf{W}_c^\Re z_t + \mathbf{b}_c^\Re), \quad (13)$$

$$\Im(g_{t,c}) = \tan h(W_c^\Im z_t + b_c^\Im), \quad (14)$$

where $Z = \{z_t \in \mathbb{R}^{D_Z} \mid t=1, \ldots, T\}$ is a sequence of $D_Z$-dimensional output vectors of the BLSTM network. $x_t = \{\Re(x_{t,f,c}), \Im(x_{t,f,c})\}_{f=1,c=1}^{F,C} \in \mathbb{R}^{2FC}$ is an input feature of a 2FC-dimensional real-value vector for the BLSTM network. This is obtained by concatenating the real and imaginary parts of all STFT coefficients in all channels. $\Re(g_{t,c})$ and $\Im(g_{t,c})$ is the real and imaginary part of filter coefficients, $\mathbf{W}_c^\Re \in \mathbb{R}^{F \times D_Z}$ and $W_c^\Im \in \mathbb{R}^{F \times D_Z}$ are the weight matrices of the output layer for c-th channel, and $\mathbf{b}_c^\Re \in \mathbb{R}^F$ and $b_c^\Im \in \mathbb{R}^F$ are their corresponding bias vectors. Using the estimated filters $g_{t,c}$, the enhanced STFT coefficients $\hat{x}_{t,f}$ are obtained based on equation (11).

This approach has several possible problems due to its formalization. The first issue is the high flexibility of the estimated filters $\{g_{t,f,c}\}_{t=1,f=1,c=1}^{T,F,C}$, which are composed of a large number of unconstrained variables (2TFC) estimated from few observations. This causes problems such as training difficulties and over-fitting. The second issue is that the network structure depends on the number and order of channels. Therefore, a new filter estimation network has to be trained when we change microphone configurations.

Mask Estimation Network

FIG. 3B is a block diagram illustrating a beamforming using a mask estimation network 350 including a BLSTM mask 360 and an MVDR formalization module 370, according to some embodiments of the present invention. In this case, the mask estimation network 350 estimates time-frequency masks using the BLSTM 360 and then determine filter coefficients based on the Minimum Variance Distortionless Response (MVDR) formalization using an MVDR module 370. Advantageously, the mask estimation network constrains the estimated filters based on well-founded array signal processing principles.

In one embodiment, the network estimates the time-frequency masks, which are used to compute the time-invariant filter coefficients $\{g_{f,c}\}_{f=1,c=1}^{F,C}$ based on the MVDR formalizations. Also, mask-based beamforming approaches have achieved great performance in noisy speech recognition benchmarks. Therefore, one embodiment of the present invention uses a mask-based MVDR beamformer (mask-based MVDR beamformer network), where overall procedures are formalized as a differentiable network for the subsequent end-to-end speech recognition system.

The mask estimation network 350 according to an embodiment computes the time-invariant filter coefficients $g(f)=\{g_{f,c}\}_{c=1}^{C} \in \mathbb{C}^{C}$ in equation (11) as follows $$g(f) = \frac{\Phi^N(f)^{-1}\Phi^S(f)}{Tr(\Phi^N(f)^{-1}\Phi^S(f))}u, \qquad (15)$$

where $\Phi^S(f) \in \mathbb{C}^{C \times C}$ and $\Phi^N(f) \in \mathbb{C}^{C \times C}$ are the cross-channel power spectral density (PSD) matrices (also known as spatial covariance matrices) for speech and noise signals, respectively. $u \in \mathbb{R}^C$ is the one-hot vector representing a reference microphone, and $Tr(\cdot)$ is the matrix trace operation. Note that although the formula contains a matrix inverse, the number of channels is relatively small, and so the forward pass and derivatives can be efficiently computed.

The PSD matrices are estimated using the expectation with respect to time-frequency masks as follows:

$$\Phi^S(f) = \frac{1}{\sum_{t=1}^{T} m_{t,f}^S} \sum_{t=1}^{T} m_{t,f}^S x_{t,f} x_{t,f}^\dagger, \qquad (16)$$

$$\Phi^N(f) = \frac{1}{\sum_{t=1}^{T} m_{t,f}^N} \sum_{t=1}^{T} m_{t,f}^N x_{t,f} x_{t,f}^\dagger, \qquad (17)$$

where $x_{t,f}=\{x_{t,f,c}\}_{c=1}^{C} \in \mathbb{C}^C$ is the spatial vector of an observed signal for each time-frequency bin, $m_{t,f}^S \in [0,1]$ and $m_{t,f}^N \in [0,1]$ are the time-frequency masks for speech and noise, respectively. † represents the conjugate transpose.

Mask Estimation Network

Figure 4:
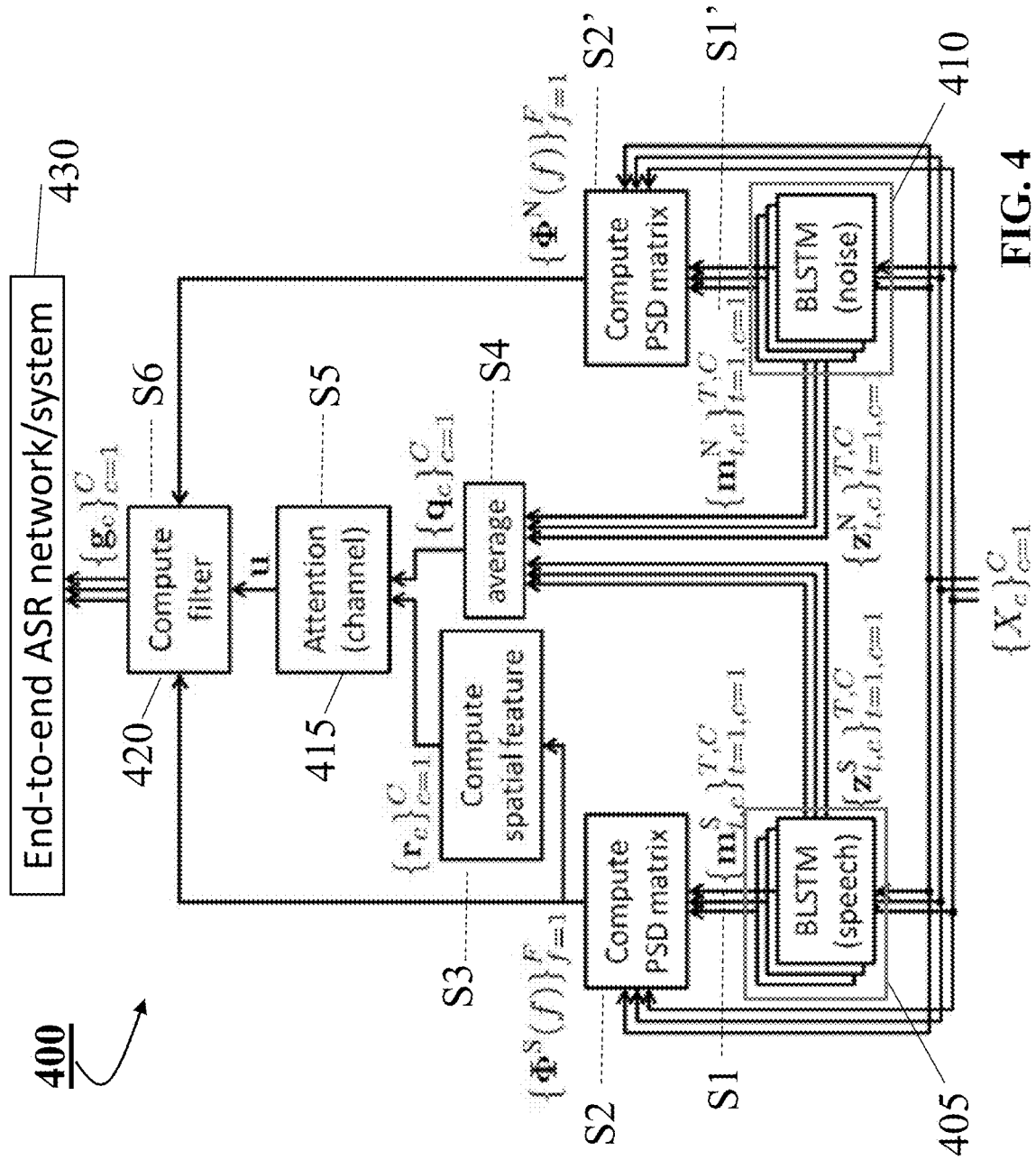
FIG. 4 is a block diagram illustrating the overall procedures for computing filter coefficients in the beamforming of FIG. 3B, according to embodiments of the present invention.

FIG. 4 is a block diagram illustrating the overall procedures for computing filter coefficients in the beamforming of FIG. 3B, according to an embodiment of the present invention.

In this case, the mask estimation uses two real-valued BLSTM networks 405 and 410. The BLSTM network 405 is used for generating a speech mask and the BLSTM network 410 is for generating a noise mask. Each of the BLSTM networks 405 and 410 outputs the time-frequency masks related speech signals and noise signals in steps S1 and S1' respectively, as follows:

$$Z_c^S = BLSTM^S(\{\bar{x}_{t,c}\}_{t=1}^T), \qquad (18)$$

$$m_{t,c}^S = \text{sigmoid}(W^S z_{t,c}^S + b^S), \qquad (19)$$

$$Z_c^N = BLSTM^N(\{\bar{x}_{t,c}\}_{t=1}^T), \qquad (20)$$

$$m_{t,c}^N = \text{sigmoid}(W^N z_{t,c}^N + b^N), \qquad (21)$$

where $Z_c^S = \{z_{t,c}^S \in \mathbb{R}^{D_Z} | t=1, \ldots, T\}$ is the output sequence of $D_Z$-dimensional vectors of the BLSTM network to obtain a speech mask over c-th channel's input STFTs. $Z_c^N$ is the BLSTM output sequence for a noise mask. $\bar{x}_{t,c} = \{\Re(x_{t,f,c}), \Im(x_{t,f,c})\}_{f=1}^{F} \in \mathbb{R}^{2F}$ is an input feature of a 2F-dimensional real-value vector. This can be obtained by concatenating the real and imaginary parts of all STFT features at c-th channel. $m_{t,c}^S = \{m_{t,f,c}^S\}_{f=1}^{F} \in [0,1]^F$ and $m_{t,c}^N$ are the estimated speech and noise masks for every c-th channel at a time step t, respectively. $W^S, W^N \in \mathbb{R}^{F \times D_Z}$ are the weight matrices of the output layers to finally output speech and noise masks, respectively, and $b^S, b^N \in \mathbb{R}^F$ are their corresponding bias vectors.

After computing the speech and noise masks for each channel, the averaged masks are obtained as follows:

$$m_t^S = \frac{1}{C}\sum_{c=1}^{C} m_{t,c}^S, \quad m_t^N = \frac{1}{C}\sum_{c=1}^{C} m_{t,c}^N. \qquad (22)$$

These averaged masks are used to estimate the PSD matrices in steps S2 and S2', respectively, as described in Eqs. (16) and (17). A PSD matrix represents correlation information between channels. To select a reference microphone from multiple microphones arranged in a 3 dimensional space (e.g. a room), the spatial correlation related to speech signals is more informative, and therefore, we only use the speech PSD matrix $\Phi^S(f)$ as a feature in step S3. Further, the time-averaged state vector $q_c \in \mathbb{R}^{2D_Z}$ extracted in step S4 from the BLSTM networks 405 and 410 for the speech and noise masks. In the next step S5, a reference microphone is estimated using a reference microphone vector u according to equation (15). It should be noted that the reference microphone vector u is from time-invariant feature vectors $q_c$ and the PSD feature vector $r_c$ as discussed in the following section. Subsequent to the selection of the reference microphone (reference channel or reference channel input) based on an attention-based neural network 415 (Attention mechanism) in step S5, the filter coefficients $\{g_{f,c}\}_{f=1,c=1}^{F,C}$ are computed in step S6 using a mask estimation network 420 based on the MVDR formalizations. The filter coefficients computed in step S6 are output to an end-to-end ASR system 430 to perform speech recognition from the multichannel inputs $\{X_c\}_{c=1}^{C}$. The formalization procedure of the multichannel inputs is discussed below.

In some cases, a PSD matrix relevant to speech signals may be referred to as speech statistics, and a PSD matrix relevant to noise signals may be referred to as noise statistics. Further, the microphones are spatially arranged in the 3D space, and each of multiple microphones may correspond to a channel. Accordingly, the multiple microphones generate multichannel signals, and one microphone provides one channel, and a primary channel signal (reference microphone) can be selected using the speech statistics or the speech and noise statistics. It should be noted that the speech and noise statistics are time-invariant features, so that the reference microphone (reference channel) selection process can be simplified compared to time-variant signal processing.

Attention-Based Reference Selection

An attention-based enocoder-decoder neural network may include an encoder neural network and an attention-based decoder neural network, in which the encoder and decoder neural networks are recurrent neural networks (RNNs). In some cases, an encoder neural networks may be referred to as an encoder network, and a decoder neural network may be referred to as a decoder network. In this case, subsampling technique is applied to some layers in the network to reduce the input sequence length, which is relevant to the number of inputs (input data). The encoder network may include a bidirectional long short term memory recurrent network. Further, the decoder network may include an LSTM-based recurrent network as a feed forward network.

To incorporate the reference microphone selection in a neural beamformer framework (beamformer network), the embodiment uses a soft-max for the vector u in equation (15) derived from an attention mechanism (attention-based neural network, referred to as an attention-based network). In this approach, the reference microphone vector u is estimated from time-invariant feature vectors $q_c$ and $r_c$ as follows:

$$\tilde{k}_c = v^T \tanh(V^Q q_c + V^R r_c + \tilde{b}), \tag{23}$$

$$u_c = \frac{\exp(\beta \tilde{k}_c)}{\sum_{c=1}^{C} \exp(\beta \tilde{k}_c)}, \tag{24}$$

where $v \in R^{1 \times D_V}$, $V^Z \in R^{D_V \times 2D_Z}$, $V^R \in R^{D_V \times 2F}$ are trainable weight parameters, $\tilde{b} \in R^{D_V}$ is a trainable bias vector. $\beta$ is the sharpening factor. We use two types of features; 1) the time-averaged state vector $q_c \in R^{2D_Z}$ extracted from the BLSTM networks for speech and noise masks in Eqs. (18) and (20), i.e., $$q_c = \frac{1}{T} \sum_{t=1}^{T} \{z_{t,c}^S, z_{t,c}^N\}, \tag{25}$$

and 2) the PSD feature $r_c \in R^{2F}$, which incorporates the spatial information into the attention mechanism. The following equation represents how to compute $r_c$:

$$r_c = \frac{1}{C-1} \sum_{c'=1, c' \neq c}^{C} \{\Re(\phi_{f,c,c'}^S), \Im(\phi_{f,c,c'}^S)\}_{f=1}^{F}, \tag{26}$$

where $\phi_{f,c,c'}^S \in C$ is the entry in c-th row and c'-th column of the speech PSD matrix $\Phi^S(f)$ in equation (16). The PSD matrix represents correlation information between channels. To select a reference microphone, the spatial correlation related to speech signals is more informative, and therefore, we only use the speech PSD matrix $\Phi^S(f)$ as a feature.

Note that, in this mask estimation based MVDR beamformer, masks for each channel can be computed separately using the same BLSTM network unlike equation (12), and the mask estimation network is independent of channels. Similarly, the reference selection network is also independent of channels, and the beamformer network deals with input signals with arbitrary number and order of channels without re-training or re-configuration of the network.

Multichannel End-to-End ASR

The multichannel end-to-end speech recognition system integrates different differential components in a single neural architecture. For example, one implementation of the multichannel end-to-end automatic speech recognition (ASR) system includes neural beamformers as a speech enhancement part, and the attention-based encoder-decoder as a speech recognition part.

The entire procedure to generate the sequence of output labels Y from the multichannel inputs $\{X_c\}_{c=1}^C$ is formalized as follows:

$$\hat{X} = \text{Enhance}(\{X_c\}_{c=1}^C), \tag{27}$$

$$\hat{O} = \text{Feature}(\hat{X}), \tag{28}$$

$$\hat{H} = \text{Encoder}(\hat{O}), \tag{29}$$

$$\hat{c}_n = \text{Attention}(\hat{a}_{n-1}, \hat{s}_n, \hat{H}), \tag{30}$$

$$\hat{y}_n = \text{Decoder}(\hat{c}_n, \hat{y}_{1:n-1}). \tag{31}$$

Enhance(•) is a speech enhancement function realized by the neural beamformer based on equation (11) with the filter estimation network 300 or the mask estimation network 350.

Feature(•) is a feature extraction function. In this case, we use a normalized log Mel filterbank transform to obtain $\ddot{o}_t \in R^{D_o}$ computed from the enhanced STFT coefficients $\hat{x}_t \in C^F$ as an input of the attention-based encoder-decoder 200:

$$p_t = \{\Re(\hat{x}_{t,f})^2 + \Im(\hat{x}_{t,f})^2\}_{f=1}^{F}, \tag{32}$$

$$\ddot{o}_t = \text{Norm}(\log(\text{Mel}(p_t))), \tag{33}$$

where $p_t \in R^F$ is a real-valued vector of the power spectrum of the enhanced signal at a time step t, Mel(•) is the operation of $D_O \times F$ Mel matrix multiplication, and Norm(•) is the operation of global mean and variance normalization so that its mean and variance become 0 and 1. Encoder(•), Attention (•), and Decoder(•) are defined in equations (7), (8), and (9), respectively, with the sequence of the enhanced log Mel filterbank like features Ô as an input. Notably, all procedures, such as enhancement, feature extraction, encoder, attention, and decoder, are connected with differentiable graphs. Thus, the embodiments can optimize the overall inference to generate a correct label sequence. Joint training of the neural network 108 in the end-to-end fashion performs the optimization.

Joint Training

In some embodiments, the neural network 108 is trained in end-to-end fashion to reduce an error between recognition of the noisy multi-channel speech signal and ground truth text corresponding the noisy multi-channel speech signal.

Training the neural network involves computing the weight values associated with the connections in the artificial-neural-network. To that end, unless herein stated otherwise, the training includes electronically computing weight values for the connections in the fully connected network, the interpolation and the convolution.

Exemplar Configuration

Some embodiments use 40-dimensional log Mel filterbank coefficients as an input feature vector for both noisy and enhanced speech signals ($D_O=40$). One embodiment use 4-layer BLSTM with 320 cells in the encoder ($D_H=320$), and 1-layer LSTM with 320 cells in the decoder ($D_S=320$). In the encoder, the embodiment subsamples the hidden states of the first and second layers and uses every second of hidden states for the subsequent layer's inputs. Therefore, the number of hidden states at the encoder's output layer is reduced to L=T/4. After every BLSTM layer, the embodiment uses a linear projection layer with 320 units to combine the forward and backward LSTM outputs. For the attention mechanism, 10 centered convolution filters ($D_F=10$) of width 100 ($D_f=100$) are used to extract the convolutional features. Some implementations set the attention inner product dimension as 320 ($D_W=320$), and use the sharpening factor α=2. To boost the optimization in a noisy environment, one embodiment uses a joint Connectionist Temporal Classification (CTC) attention multi-task loss function, and set the CTC loss weight as 0.1.

For decoding, some embodiments use a beam search method with the beam size 20 at each output step to reduce the computation cost. The CTC scores can also be used to re-score the hypotheses with 0.1 weight. One embodiment uses a length penalty term to the decoding objective and set the penalty weight as 0.3. Some embodiments pursue a pure end-to-end setup without using any external lexicon or language models, and used CER as an evaluation metric.

Some implementations use 256 STFT coefficients and the offset were computed from 25 ms-width hamming window with 10 ms shift (F=257). Both filter and mask estimation networks can use similar a 3-layer BLSTM with 320 cells ($D_Z$=320) without the subsampling technique. For the reference selection attention mechanism, some embodiments used the same attention inner product dimension ($D_V$=320) and sharpening factor β=2 as those of the encoder-decoder network.

Shared Configurations

In some configurations, all the parameters are initialized with the range [−0.1, 0.1] of a uniform distribution using the AdaDelta method with gradient clipping for optimization. Some implementations initialize the AdaDelta hyperparameters ρ=0.95 and ε=$1^{-8}$. Once the loss over the validation set was degraded, these implementations decrease the AdaDelta hyperparameter ε by multiplying it by 0.01 at each subsequent epoch. For example, the training procedure can stop after 15 epochs. During the training, some embodiments adopted multi-condition training strategy, i.e., in addition to the optimization with the enhanced features through the neural beamformers, these embodiments also used the noisy multichannel speech data as an input of encoder-decoder networks without through the neural beamformers. The entire network is trained from scratch without any pre-training procedures. The neural networks can be implemented by using Chainer.

Example Setup of Implementation

FIG. 5 shows experimental results indicating character error rate for CHIME-4 corpus, according to embodiments of the present invention. This figure shows the recognition performances of CHiME-4 with the five systems: NOISY, BEAMFORMIT, FILTER NET, MASK NET (REF), and MASK NET (ATT). NOISY and BEAMFORMIT were the baseline single channel end-to-end systems, which did not include the speech enhancement part in their frameworks. Their end-to-end networks were trained only with noisy speech data by following a conventional multi-condition training strategy. During decoding, NOISY used single-channel noisy speech data from 'isolated 1ch track' in CHiME-4 as an input, while BEAMFORMIT used the enhanced speech data obtained from 5-channel signals with BeamformIt known in the art as delay-and-sum beamformer, as an input.

FILTER NET, MASK NET (REF), and MASK NET (ATT) were the multichannel end-to-end systems described above. To evaluate the validity of the reference selection, we prepared MASK NET (ATT) based on the maskbased beamformer with attention-based reference selection. In other words, the beamformer network is a mask estimation network. Further, MASK NET (REF) with 5-th channel is used as a fixed reference microphone, which is located on the center front of the tablet device.

It is also shown in FIG. 5 that BEAMFORMIT, FILTER NET, MASK NET (REF), and MASK NET (ATT) outperformed NOISY, which confirms the effectiveness of combining speech enhancement with the attention-based encoder decoder framework. The comparison of MASK NET (REF) and MASK NET (ATT) validates the use of the attention-based mechanism for reference selection. FILTER NET, which is based on the filter estimation network described in Section 3.1, also improved the performance compared to NOISY, but worse than MASK NET (ATT). This is because it is difficult to optimize the filter estimation network due to a lack of restriction to estimate filter coefficients, and it needs some careful optimization. Finally, MASK NET (ATT) achieved better recognition performance than BEAMFORMIT, which proves the effectiveness of our joint integration rather than a pipe-line combination of speech enhancement and (end-to-end) speech recognition.

Further, the effectiveness of the multichannel end-to-end framework is described below. FIG. 6 shows experimental results for the AMI corpus, indicating comparison of the recognition performance of the three systems, according to embodiments.

In this case, FIG. 6 shows experimental results for the AMI corpus, indicating comparison of the recognition performance of the three systems: NOISY, BEAMFORMIT, and MASK NET (ATT). In NOISY, we used noisy speech data from the 1st channel in AMI as an input to the system. FIG. 6 also indicates that, even in the AMI, our proposed MASK NET (ATT) achieved better recognition performance than the attention-based baselines (NOISY and BEAMFORMIT), which also confirms the effectiveness of our proposed multichannel end-to-end framework. Note that BEAMFORMIT was worse than NOISY even with the enhanced signals. This phenomenon is sometimes observed in noisy speech recognition that the distortion caused by sole speech enhancement degrades the performance without re-training. Our end-to-end system jointly optimizes the speech enhancement part with the ASR objective, and can avoid such degradations.

FIG. 7 shows experimental results indicating an influence of the CHiME-4 validation accuracies, according to embodiments of the present invention. FIG. 7 shows an influence of the CHiME-4 validation accuracies on the number and order of channels. The validation accuracy was computed conditioned on the ground truth labels $y^*_{1:n-1}$ in Equation (10) during decoder's recursive character generation, which has a strong correlation with CER. The second column of the table represents the channel indices, which were used as an input of the same MASK NET (ATT) network.

Comparison of 5_6_4_3_1 and 3_4_1_5_6 shows that the order of channels did not affect the recognition performance of MASK NET (ATT). In addition, even when we used fewer three or four channels as an input, MASK NET (ATT) still outperformed NOISY (single channel). These results confirm that the multichannel end-to-end system according to the present disclosure can deal with input signals with arbitrary number and order of channels, without any reconfiguration and re-training.

Visualization of Features Processed by the Beamformer Network

We will analyze the behavior of our developed speech enhancement component with a neural beamformer (beamformer network) according to embodiments of the present invention.

Figures 8A, 8B, 8C:
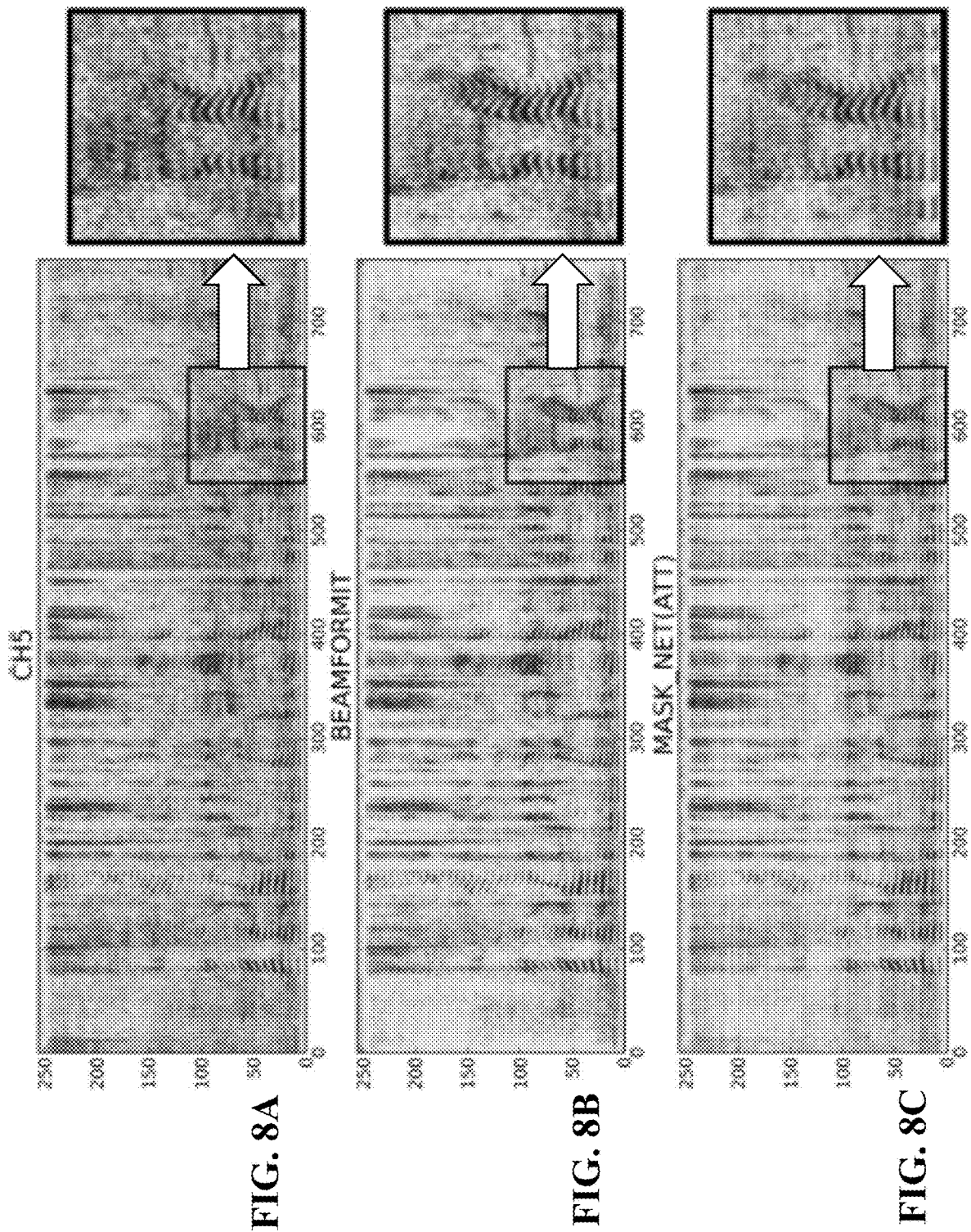
FIG. 8A is a diagram indicating a log-magnitude spectrogram of the CHiME-4 utterance with the 5-th channel noisy signal, according to embodiments of the present invention.
FIG. 8B is a diagram indicating a log-magnitude spectrogram of an enhanced signal with BeamformIT, according to embodiments of the present invention.
FIG. 8C is a diagram indicating a log-magnitude spectrogram of an enhanced signal with MASK_NET (ATT), according to embodiments of the present invention.

FIGS. 8A-8C indicate the spectrograms of the same CHiME-4 utterance with the 5-th channel noisy signal, enhanced signal with BeamformIt (a related art), and enhanced signal with our proposed MASK NET (ATT).

FIG. 8A is a diagram indicating a log-magnitude spectrogram of the CHiME-4 utterance with the 5-th channel noisy signal, FIG. 8B is a diagram indicating a log-magnitude spectrogram of an enhanced signal with BeamformIt, and FIG. 8C is a diagram indicating a log-magnitude spectrogram of an enhanced signal with MASK_NET (ATT). In the figures, the squared areas related to the noisy and enhanced signals are extracted and shown at the sides of the figures.

We could confirm that the BeamformIt and MASK NET (ATT) successfully suppressed the noises comparing to the 5-th channel signal by eliminating blurred gray areas overall. In addition, by focusing on the insides of black boxes, the harmonic structure, which was corrupted in the 5-th channel signal, was recovered in BeamformIt and MASK NET (ATT). BeamformIt and MASK NET (ATT). This result suggests that our proposed MASK NET (ATT) successfully learned a noise suppression function similar to the conventional beamformer, although it is optimized based on the end-to-end ASR objective, without explicitly using clean data as a target.

Reduction of Computation Cost for Noisy Speech Recognition

Further, this invention can reduce the computational cost for noisy speech recognition, and therefore it reduces the central processing unit (CPU) usage or graphic processing unit (GPU) usage, power consumption, and/or network bandwidth usage.

Generally, in speech recognition, only a small number of word/character sequence hypotheses are searched to find the most likely word/character sequence for a given speech input. For example, a beam search method is used, in which shorter hypotheses are scored first, and only promising hypotheses with top N highest scores are extended by adding a word/character to the end of each promising hypothesis, where N is the beam size. After repeating this hypothesis extension and scoring until the hypotheses have a certain length, the best-scored hypothesis is selected as the speech recognition result from among all the scored hypotheses. The computation cost of the beam search is much less than the full search that enumerates and scores all possible hypotheses.

However, if there exists background noise in the speech signal, the beam search method may fail to identify the promising hypotheses, because the noise signal increases the ambiguity of speech features and the scores get close to each other. In this case, the hypothesis that actually has the best score may not be found since it may be pruned while its length is short. To ensure that the best hypothesis is found, more hypotheses need to be extended by increasing the beam size. This obviously increases the computation cost for speech recognition. Since this invention contains a jointly trained beamformer network, which reduces the ambiguity of speech features by suppressing the noise, we do not have to increase the number N to find the best hypothesis even for noisy speech.

Figure 9:
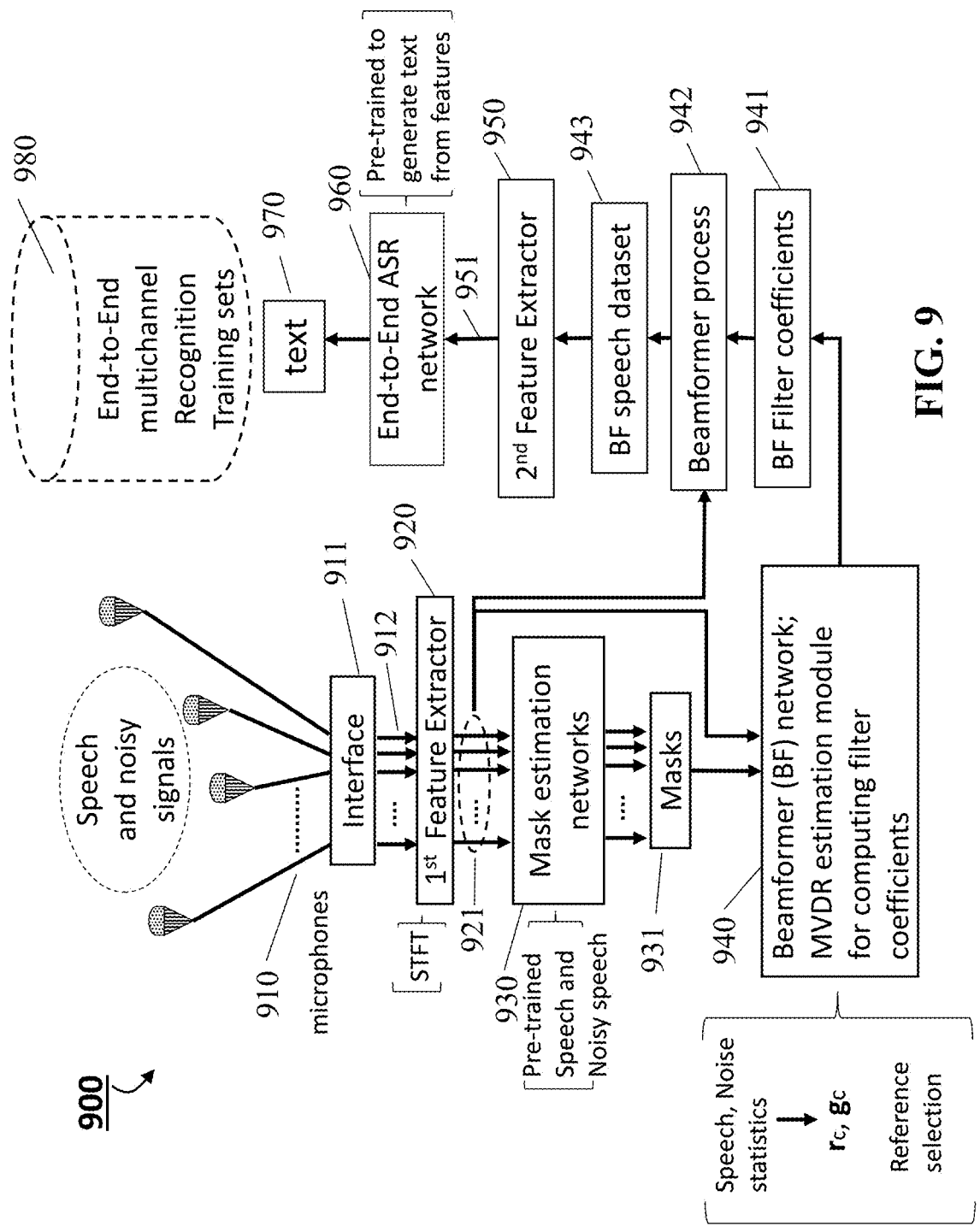
FIG. 9 is a block diagram illustrating an end-to-end ASR system, according to embodiments of the present invention.

FIG. 9 is a diagram illustrating an end-to-end multichannel speech recognition performed by a multichannel end-to-end speech recognition system 900 according to an embodiment of the present invention.

The multichannel end-to-end automatic speech recognition (ASR) system 900 includes multiple microphones 910 connected to an interface 911. The multichannel ASR system 900 also includes a first feature extractor 920, a mask estimation network 930, a beamformer (BF) network 940, a second feature extractor 950, and an end-to-end ASR neural network (ASR network) 960. The first feature extractor 920, the mask estimation network 930, the BF network 940 and the second feature extractor 950 are program modules stored in one or more memories or storages (not shown) of the ASR system 900, and perform data processing according to the program codes of the program modules when executed by one or more processors (not shown) in the system 900.

The mask estimation network 930 includes pre-trained mask data sets that have been obtained by training the mask estimation network 930 using predetermined mask estimation ground truth input data.

The beamformer network 940 includes pre-trained beamformer data sets that have been obtained by training the BF network 940 using predetermined beamformer ground truth input data.

The ASR network 960 includes pre-trained ASR data sets that have been obtained by training the ASR network 960 using predetermined ASR ground truth input data.

The interface 911 converts acoustic speech and noisy signals provided from the microphones 910 to multichannel digital input data (multichannel inputs) 912. In this case, the multichannel inputs 912 correspond to the outputs of the microphones 910, respectively. In some cases, the microphones 910 may be an array of microphones or arranged at predetermined positions in a three dimensional (3D) space.

The multichannel inputs 912 are introduced into the first feature extractor 920 that extracts signal features 921 from the outputs of individual microphones 910 based on short-term Fourier-transformation (STFT) algorithm. The signal features 921 of the multichannel inputs 912 are processed using the mask estimation network 930, and the mask estimation network 930 estimates and generates masks 931 including speech relevant masks and noise-relevant masks, which are the time-frequency masks corresponding to respective channels to compute the time-invariant filter coefficients $\{g_{f,c}\}_{f=1,c=1}^{F,C}$ based on the MVDR formalizations. The speech relevant masks and the noise relevant masks are respectively averaged by the number of channels to estimate the PSD matrices expressed in equations (16) and (17). Thus, the masks 931 are the averaged speech relevant mask and the averaged noise mask (not shown). In this case, the mask estimation network 930 is pre-trained using predetermined ground truth datasets.

Further, the extracted features 921 is processed with the masks 931 based on an MVDR estimation module included in the BF network 940 to compute BF filter coefficients 941. In this case, the filter coefficients 941 are the time-invariant filter coefficients $g(f)=\{g_{f,c}\}_{c=1}^{C} \in \mathbb{C}^C$ corresponding to the cross-channel power spectral density (PSD) matrices (features) for the speech and noise signals. The computed filter coefficients 941 are processed with the features 921 by the BF network 940 in the beamformer process 942 to generate a beamformed speech dataset 943. In this case, the beamformed speech dataset 943 is an enhanced speech dataset of a single channel. Further, the second feature extractor 950 extracts features from the BF speech dataset and provides the endo-to-end ASR network (ASR network) 960 with the extracted features 951. Finally, the ASR network 960 outputs texts 970 by processing the extracted features 951.

While training the end-to-end ASR system 900, predetermined end-to-end ground truth datasets are introduced to the mask estimation networks 930 directly instead of using the extracted features 921 and an error between an output text 970 and its corresponding ground truth is obtained every ground truth dataset, and the backward propagation process is performed until the entire predetermined end-to-end ground truth datasets are processed. The network parameters of the mask estimation networks 930, the BF network 940 and the ASR network 960 obtained through the end-to-end training process using the predetermined end-to-end ground truth datasets are stored into one or more storages 980 as end-to-end multichannel recognition training sets.

In another end-to-end ASR system according to one embodiment, the end-to-end ASR system may include a processor connected by a bus to a read only memory (ROM) and a memory. The training system can also include are a display to present information to the user, and a plurality of input devices including a keyboard, mouse and other devices that may be attached via input/output port. Other input devices such as other pointing devices or voice sensors or image sensors can also be attached. Other pointing devices include tablets, numeric keypads, touch screen, touch screen overlays, track balls, joy sticks, light pens, thumb wheels etc. The I/O can be connected to communications lines, disk storage, input devices, output devices or other I/O equipment. The memory includes a display buffer that contains pixel intensity values for a display screen. The display periodically reads the pixel values from the display buffer displaying these values onto a display screen. The pixel intensity values may represent grey-levels or colors.

The memory includes a database, trainer, the neural network, preprocessor. The database can include the historical data, training data, testing data. The database may also include results from operational, training or retaining modes of using the neural network. These elements have been described in detail above.

Also shown in memory is the operating system. Examples of operating systems include AIX, OS/2, and DOS. Other elements shown in memory include device drivers which interpret the electrical signals generated by devices such as the keyboard and mouse. A working memory area is also shown in memory. The working memory area can be utilized by any of the elements shown in memory. The working memory area can be utilized by the neural network, trainer, the operating system and other functions. The working memory area may be partitioned amongst the elements and within an element. The working memory area may be utilized for communication, buffering, temporary storage, or storage of data while a program is running.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A speech recognition system for speech recognition, comprising:
an input interface to receive multi-channel speech signals;
one or more storages to store neural networks executable by at least one processor for performing a method, the method comprising:
performing the speech recognition using a multichannel speech recognition neural network including a beamformer network trained to determine first microphone data sets from the multi-channel signal into a single-channel signal, wherein the beamformer network and the encoder-decoder network are jointly optimized, and a recognition sub-network trained to recognize text from speech features of the single-channel signal, wherein the enhancement sub- network and the recognition sub-network are jointly trained; and
an output interface to provide the recognized text.

2. The speech recognition system of claim 1, wherein the multichannel speech recognition network further comprises mask estimation networks, wherein the mask estimation networks include a first mask network and a second mask network, wherein the first mask network is trained to generate speech masks for the multichannel inputs and the second mask network is trained to generate noise masks for the multichannel inputs.

3. The speech recognition system of claim 1, wherein the first and second mask networks are integrated with the beamformer network.

4. The speech recognition system of claim 1, wherein the encoder-decoder network is an attention-based encoder-decoder network.

5. The speech recognition system of claim 1, wherein the beamformer network uses frequency-domain datasets.

6. The speech recognition system of claim 1, wherein the multichannel speech recognition network includes a first feature extractor to extract signal features from the multi-channel inputs based on short-term Fourier-transformation algorithm.

7. The speech recognition system of claim 6, wherein the first feature extractor used log Mel filterbank coefficients for the signal features.

8. The system of claim 1, wherein the beamformer network uses speech power spectral density (PSD) matrices.

9. The system of claim 1, wherein the multichannel speech recognition network further comprises mask estimation networks, wherein the mask estimation networks are bi-directional long-short term memory recurrent neural networks.

10. The system of claim 1, wherein the multichannel speech recognition network further comprises mask estimation networks, wherein the multichannel speech recognition network further comprises a first feature extractor connected to the mask estimation networks, wherein the first feature extractor is a differentiable function.

11. The system of claim 10, wherein the differentiable function is a bark function of a magnitude of the channel signal.

12. The system of claim 1, wherein the input interface is an array of microphones, and wherein the output interface includes a display device.

13. The system of claim 1, wherein the neural network is trained in end-to-end fashion to reduce an error between a recognition of the noisy multi-channel speech signal and a ground truth text corresponding the noisy multi-channel speech signal.

14. A non-transitory computer readable storage medium embodied thereon a program executable by a processor for performing a method, the method comprising:
receiving multi-channel speech signals from an input interface;
performing the speech recognition using a multichannel speech recognition neural network including a beamformer network trained to determine first microphone data sets the multi-channel signal into a single-channel signal, wherein the beamformer network and the encoder-decoder network are jointly optimized, and a recognition sub-network trained to recognize text from speech features of the single-channel signal, wherein the enhancement sub- network and the recognition sub-network are jointly trained; and
providing the recognized texts to an output interface.

15. The non-transitory computer readable storage medium of claim 14, wherein the multichannel speech recognition network further comprises
mask estimation networks configured to generate time-frequency masks from the multichannel inputs.

16. The non-transitory computer readable storage medium of claim 14, wherein the beamformer network automatically selects a reference channel or microphone vector that is estimated using an attention mechanism of a neural network.

17. The non-transitory computer readable storage medium of claim 14, wherein the beamformer network and the encoder-decoder network are jointly optimized.

18. A computer-implemented method executable by a processor for speech recognition comprising:
receiving multi-channel speech signals from an input interface;
performing the speech recognition using a multichannel speech recognition neural network including a beamformer network trained to determine first microphone data sets the multi-channel signal into a single-channel signal, wherein the beamformer network and the encoder-decoder network are jointly optimized, and a recognition sub-network trained to recognize text from speech features of the single-channel signal, wherein the enhancement sub- network and the recognition sub-network are jointly trained; and
providing the recognized texts to an output interface.

19. The computer-implemented method of claim 18, wherein the multichannel speech recognition network further comprises
mask estimation networks configured to generate time-frequency masks from the multichannel inputs.

20. The computer-implemented method of claim 18, wherein the beamformer network automatically selects a reference channel vector that is estimated using an attention mechanism of a neural network.

21. The computer-implemented method of claim 18, wherein the beamformer network and the encoder-decoder network are jointly optimized.

* * * * *